United States Patent [19]

Suzuki et al.

[11] Patent Number: 4,630,121
[45] Date of Patent: Dec. 16, 1986

[54] AUTOMATIC FOCUS DETECTING CIRCUIT

[75] Inventors: Koji Suzuki; Masahiro Kawasaki; Harumi Aoki, all of Tokyo, Japan

[73] Assignee: Asahi Kogaku Kogyo K.K., Tokyo, Japan

[21] Appl. No.: 583,499

[22] Filed: Feb. 24, 1984

[30] Foreign Application Priority Data

Feb. 24, 1983 [JP] Japan .................................. 58-28615

[51] Int. Cl.$^4$ ............................................. H04N 3/26
[52] U.S. Cl. ................................... 358/227; 358/213
[58] Field of Search ............... 358/227, 221, 226, 224, 358/225, 85, 228, 213, 212; 250/578, 204; 357/24 LR; 354/406, 403, 408, 404, 402, 407, 405

[56] References Cited

U.S. PATENT DOCUMENTS 4,301,478 11/1981 Sakane et al. ........................ 358/227
4,366,501 12/1982 Tsunekawa et al. ................. 358/310
4,484,223 11/1984 Tsunekawa .......................... 358/213
4,489,350 12/1984 Kimura ................................ 358/213

FOREIGN PATENT DOCUMENTS 52-40697 11/1978 Japan .................................. 358/221

Primary Examiner—Robert G. Lev
Attorney, Agent, or Firm—Sughrue, Mion, Zinn Macpeak & Seas

[57] ABSTRACT

An automatic focus detecting circuit in which dark current is completely compensated for. At least one element of an array of photoelectric elements is shielded from light to obtain a photoelectric output corresponding to a dark current component. The entire array is scanned, and the output corresponding to the dark current component derived from the shielded element is sampled and held. The sampled-and-held output is subtracted from the outputs of all of the other elements to obtain a final output compensated completely for dark current.

4 Claims, 10 Drawing Figures

AUTOMATIC FOCUS DETECTING CIRCUIT

BACKGROUND OF THE INVENTION

The present invention relates to a dark current compensating circuit for compensating so-called "dark" current contained in photoelectric outputs of a photosensor device which are generated by scanning a plurality of photoelectric elements in which charges are accumulated.

Heretofore, automatic focus detectors for video cameras have employed a self-scanning type photoelectric element scanning circuit in which an array of photoelectric elements in which charges are accumulated is scanned in a predetermined direction and the charges of the photoelectric elements are sequentially transferred to an output. The magnitude of the photoelectric output depends on the intensity of incident light applied thereto. However, even if no light is applied to the photoelectric element, a certain amount of charge still tends to accumulate.

FIG. 1 is a graphical representation showing the photoelectric characteristic of a photoelectric element. In this graphical representation, the horizontal axis represents the intensity of light E, and the vertical axis represents the charge accumulation quantity Q. In FIG. 1, reference numerals 1, 2 and 3 designate charge accumulation lines indicating variations of the charge accumulation quantity Q. The charge accumulation times $T_1$, $T_2$ and $T_3$ of the charge accumulation lines 1, 2 and 3 are reduced in the stated order as the intensity of light E increases. As the intensity of light E increases, the photoelectric element becomes saturated at the same rate. Moreover, if the charge accumulation time is long, the photoelectric element will be saturated even when the intensity of light E is small. Accordingly, even if no light is applied to the photoelectric element, charges are accumulated therein, which gives rise to a "dark" current component in the photoelectric output. The quantity of charges accumulated as the dark current component tends to increase as the intensity of light E decreases and increase with high temperature and humidity because of the physical properties of the photoelectric element. Accordingly, under conditions of high temperature and high humidity, the dark current component may be larger than the photoelectric output, thus resulting in a large error in focus detection.

In view of the foregoing, an object of the invention is to provide a photoelectric output dark current compensating circuit for use in an automatic focus detecting device which eliminates the dark current component from the photoelectric output provided by the photoelectric element.

SUMMARY OF THE INVENTION

In accordance with the above and other objects of the invention, there is provided an automatic focus detecting circuit including an array of photoelectric elements of which at least one is shielded from light, a scanning circuit for scanning the array of photoelectric elements in a predetermined order to sequentially transfer out charges accumulated in the photoelectric elements to provide photoelectric outputs, a sample-and-hold circuit receiving from the scanning circuit as an input a photoelectric output from the at least one photoelectric element shielded from light, and a subtraction circuit having one input coupled to the output of the sample-and-hold circuit and the other coupled to receive the photoelectric outputs other than the output corresponding to the element shielded from light to subtract the two to thereby provide a photoelectric output compensated for dark current.

DESCRIPTION OF THE PREFERRED EMBODIMENTS

A photoelectric output dark current compensating circuit constructed according to the present invention will be described with reference to the accompanying drawings.

Figure 2:
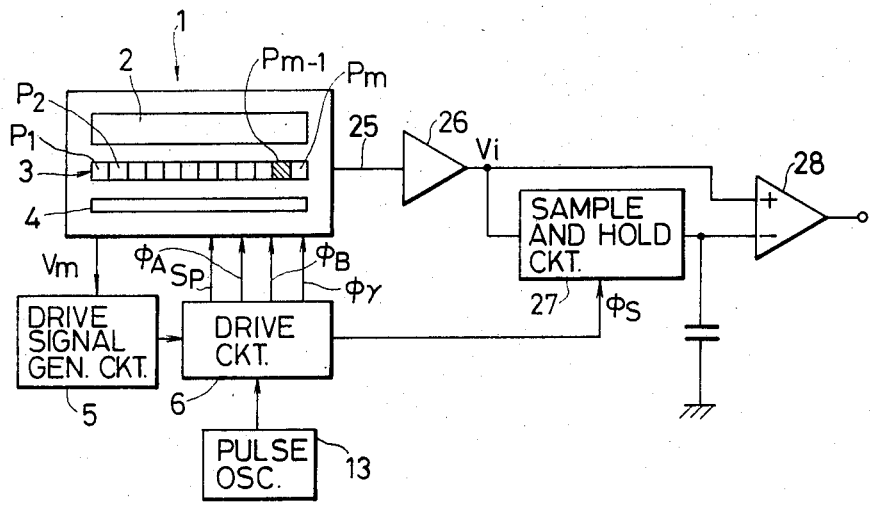
FIG. 2 is a block diagram showing a photoelectric output dark current compensating circuit according to the invention.
Figure 3:
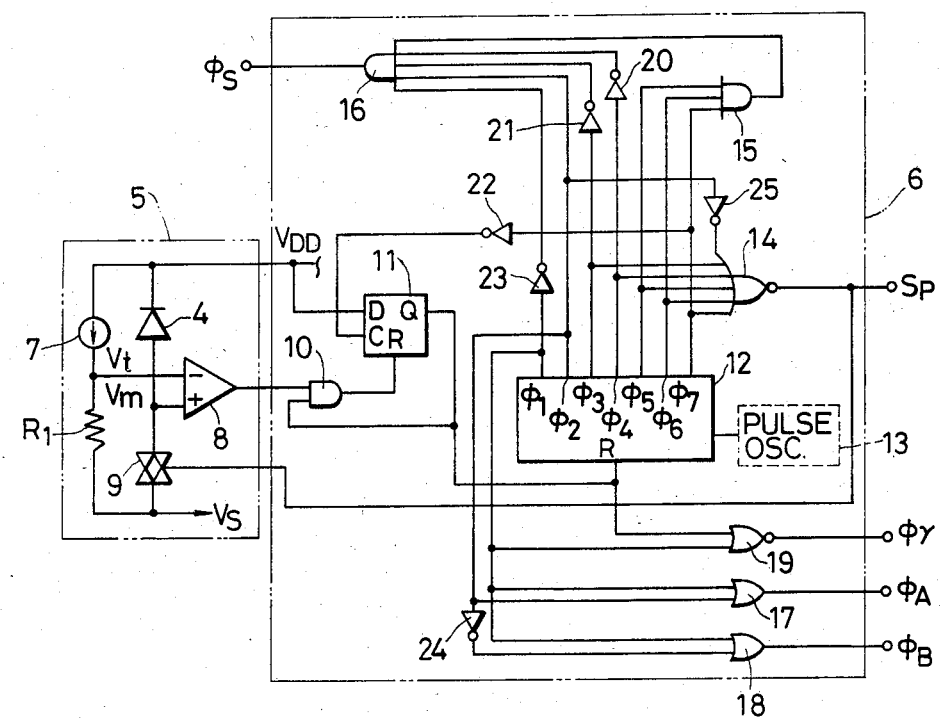
FIG. 3 is a circuit diagram showing a drive signal geneating circuit and a drive circuit in a dark current compensating circuit of the invention.

In FIG. 2, reference numeral 1 designates a self-scanning type photoelectric conversion element section which includes a self-scanning type photoelectric element scanning circuit 2; a photoelectric conversion element array 3; and a light-detecting element array 4. The self-scanning type photoelectric element scanning circuit 2 scans the photoelectric conversion element array 3 in a predetermined direction to sequentially transfer out charges accumulated in the photoelectric conversion element array 3 to thus generate a photoelectric output. The light-detecting element array 4 provides an output $V_m$ according to the average intensity of light received. The photoelectric elements $P_1$, $P_2$, ... $P_{m-1}$ and $P_m$ are arranged according to the intensity distribution. The output voltage $V_m$ of the light-detecting element array 4 is applied to a drive signal generating circuit 5. The function of the circuit 5 is to change the drive period of a drive circuit 6 (described below). These circuits 5 and 6 are shown in FIG. 3 in more detail.

The drive signal generating circuit 5 includes a constant current source 7, a comparator 8, an analog switch 9, and a resistor $R_1$. A threshold value $V_t$ is applied to the negative terminal of the comparator 8 using the constant current source 7 and the resistor $R_1$. An output voltage $V_m$ at the anode terminal of the light-detecting element array 4 is compared with the threshold value $V_t$ by the comparator 8. When the output voltage $V_m$ exceeds the threshold value $V_t$, the comparator 8 outputs a drive signal. The provision of the drive signal is stopped when the analog switch 9 is turned on.

The drive circuit 6 is used to drive the photoelectric conversion element section 1. The drive circuit 6 is composed of an AND gate 10, a flip-flop 11, a seven-bit binary counter 12, a pulse generating circuit 13, a start pulse generating circuit 14, an AND gate 15, a sampling pulse signal output circuit (AND gate) 16, scanning pulse signal output circuit (OR gates) 17 and 18, and a reset pulse signal output circuit (NOR gate) 19. In FIG. 3, reference numerals 20 through 25 designate inverters.

The supply voltage is applied to the D terminal of the flip-flop 11, the output at the Q terminal of which is applied to the AND gate 10 and to the reset terminal R of the seven-bit binary counter 12. When the output at the Q terminal of the flip-flop circuit 11 is at a H (high) logic level and the output of the comparator 8 is at the H level, the flip-flop 11 is reset so that the output of the Q terminal is set to the L (low) logic level.

The L output at the Q terminal is raised to H in response to an input to the clear terminal C of the flip-flop 11. The binary counter 12 has output terminals $\phi_1$ through $\phi_7$ and receives as a clock signal a pulse signal from the pulse generating circuit 13. When the output at the Q terminal of the flip-flop 11 is at H, the binary counter 12 is reset, and hence the outputs at the terminals $\phi_1$ through $\phi_7$ are at L.

Figure 4:
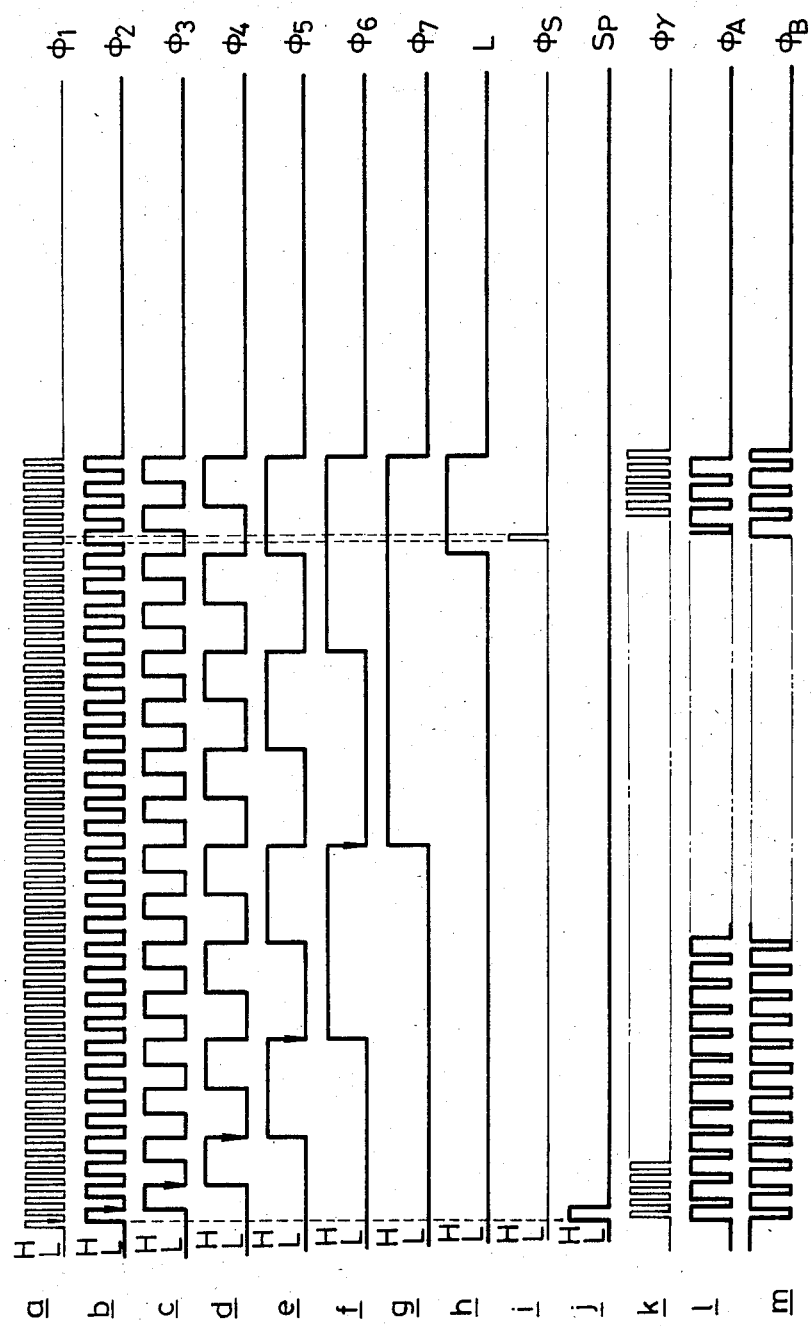
FIG. 4 is a timing chart showing the output signals of the drive circuit in the dark current compensating circuit of the invention.

Waveforms a through g in FIG. 4 show output signals provided at the terminals $\phi_1$ through $\phi_7$, respectively, which are outputted in synchronization with the falling edges of the pulse signals. The output at the terminal $\phi_7$ is applied to the clock terminal C of the flip-flop 11. When the output at the terminal $\phi_7$ is set to L, the seven-bit binary counter circuit 12 is held in the reset state. Waveform h in FIG. 4 indicates the output signal L of the AND gate 15; i, a sampling pulse signal $\phi_S$; j, a start pulse signal Sp; k, a reset pulse signal $\phi_4$; l, a scanning pulse signal $\phi_A$; and m, a scanning pulse signal $\phi_B$. Two scanning pulse signals $\phi_A$ and $\phi_B$ and one reset pulse signal $\phi_r$ are used for scanning the photoelectric conversion element array 3.

The start pulse signal Sp turns on and off the analog switch 9. When the start pulse signal Sp is applied to the drive signal generating circuit 5, the signal at the positive terminal of the comparator 8 is set to a level $V_s$ so that the drive signal generating circuit 5 is restored to a zero output.

At least one of the photoelectric elements $P_1$, $P_2$, . . . $P_{m-1}$ and $P_m$ is shielded from light. In the described embodiment, the photoelectric element $P_{m-1}$ next to the photoelectric element $P_m$ which is at the end in the scanning direction is shielded from light. This is due to the fact that the photoelectric output of the element $P_m$ is not accurate because of the end effect. The element $P_{m-1}$ is used for compensating for the dark current component.

Figure 1:
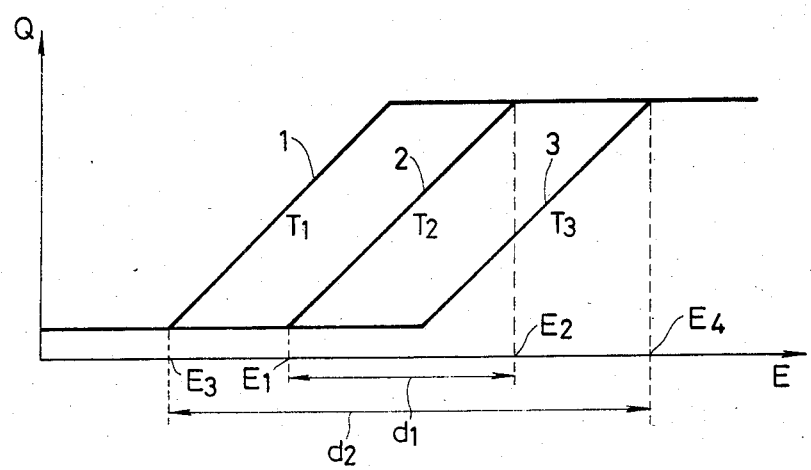
FIG. 1 is a graphical representation showing the photoelectric characteristic of photoelectric elements employed in the invention.
Figure 5:
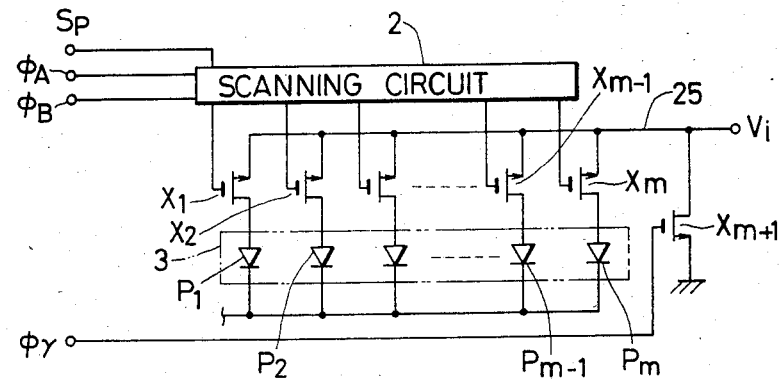
FIG. 5 is a detailed circuit diagram showing a self-scanning type photoelectric element drive in the dark current compensating circuit of the invention.

FIG. 5 shows an example of essential parts of the photoelectric conversion element section 1. In FIG. 5, $X_1, X_2, \ldots, X_{m-1}, X_m$ and $X_{m+1}$ designate FET gates. The start pulse signal Sp and the scanning pulse signals $\phi_A$ and $\phi_B$ are applied to the self-scanning type scanning circuit 2, and the reset pulse signal $\phi_r$ is applied to the FET gate $X_{m+1}$. The FET gates $X_1$ through $X_m$ are turned on in the stated order so that the charges accumulated in the photoelectric elements $P_1$ through $P_m$ are sequentially transferred out as a photoelectric output $V_i$ on a signal line 25. The photoelectric output $V_i$ is amplified by an amplifier circuit 26 (shown in FIG. 1). The photoelectric output $V_i$ thus amplified is applied to a sample-and-hold circuit 27 and a subtraction circuit 28. The sample-and-hold circuit 27 is used to sample and hold the photoelectric output of the photoelectric element $P_{m-1}$ which is shielded from light. The circuit 27 and the reduction circuit 28 are shown in FIG. 6 in more detail.

Figure 6:
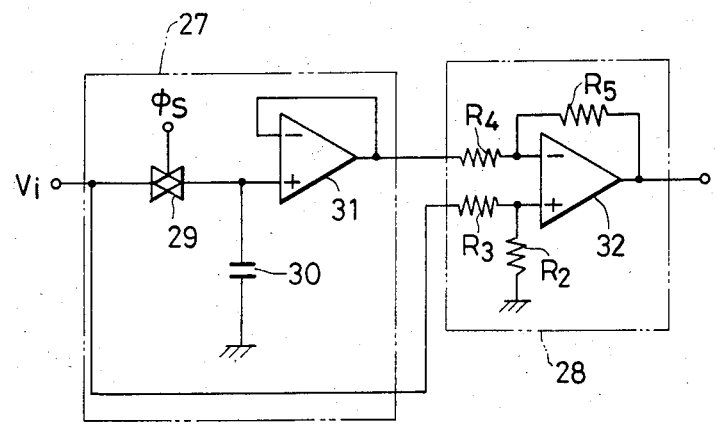
FIG. 6 is a detailed circuit diagram showing a sample-and-hold circuit and a subtraction circuit in the dark current compensating circuit of the invention.

In FIG. 6, reference numeral 29 designates an analog switch, 30 a capacitor, and 31 a buffer amplifier, or an operational amplifier. When the sampling pulse signal $\phi_S$ is applied to the circuit 27, the analog switch 29 is turned on while the operational amplifier 31 samples and holds as a dark current component the photoelectric output $V_i$ of the light-shielded photoelectric element $P_{m-1}$.

The subtraction circuit 28 is implemented with an operational amplifier 32, which is a differential amplifier in this case, and resistors $R_2$ through $R_5$. The amplified photoelectric output $V_i$ is applied to the noninverting terminal of the operational amplifier 32, to the inverting terminal of which a photoelectric output corresponding to the dark current component is applied. The operational amplifier 32 reduces the photoelectric output corresponding to the dark current component from the amplified photoelectric output.

The operation of this circuit will be described with reference to FIGS. 7 through 10.

Figure 7:
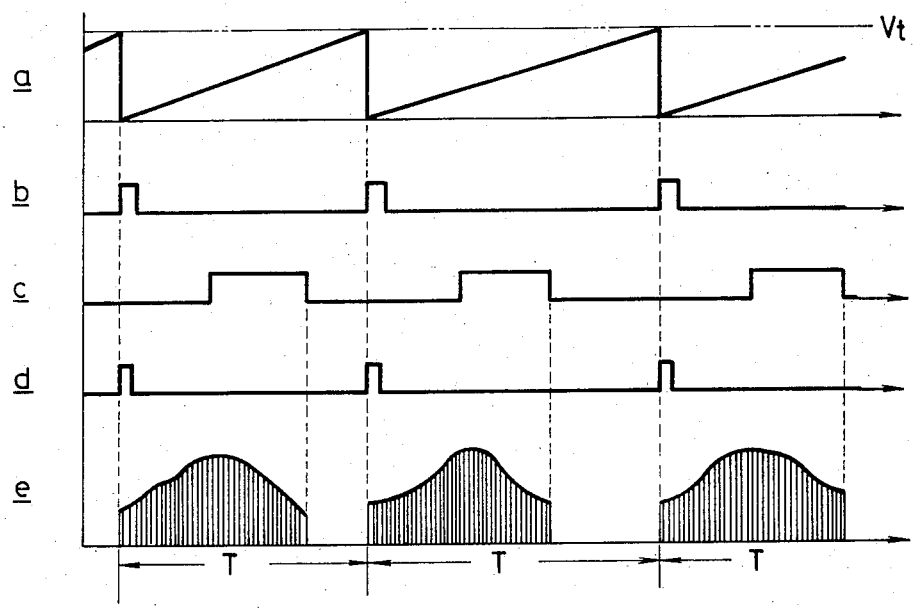
FIGS. 7, 8 and 9 are timing charts for a description of the operation of the photoelectric output dark current compensating circuit according to the invention.

FIG. 7 is a diagram used for a description of the relation of the output voltage $V_m$ and the charge accumulation time T of the light-detecting element array 4 with the start pulse signal Sp and the output at the terminal $\phi_7$ of the binary counter circuit 12. Waveform a of FIG. 7 indicates the characteristic of the output voltage $V_m$ of the light-detecting element 4; b, the output period of the drive signal; c, the period of the output at the terminal $\phi_7$ of the binary counter 12; d, the output period of the start pulse signal; and e, the output characteristic of the photoelectric output.

Figure 8:
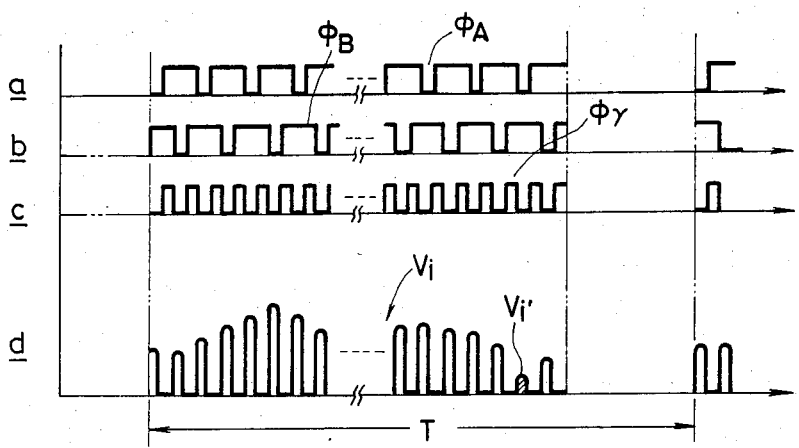

FIG. 8 is a timing chart showing the relationships between the scanning pulse signals $\phi_A$ and $\phi_B$, the reset pulse signal $\phi_r$, and d, the photoelectric output. The photoelectric output is obtained when the scanning pulse signals $\phi_A$ and $\phi_B$ are at H and L, levels, respectively. Pulses of the reset pulse signal are outputted before and after the times when the scanning pulse signal $\phi_B$ is at L in order for the charge of each photoelectric element to be used as a charging voltage. In FIG. 8, $V_i$ designates the photoelectric output of the light-shielded photoelectric element $P_{m-1}$.

Figure 9:
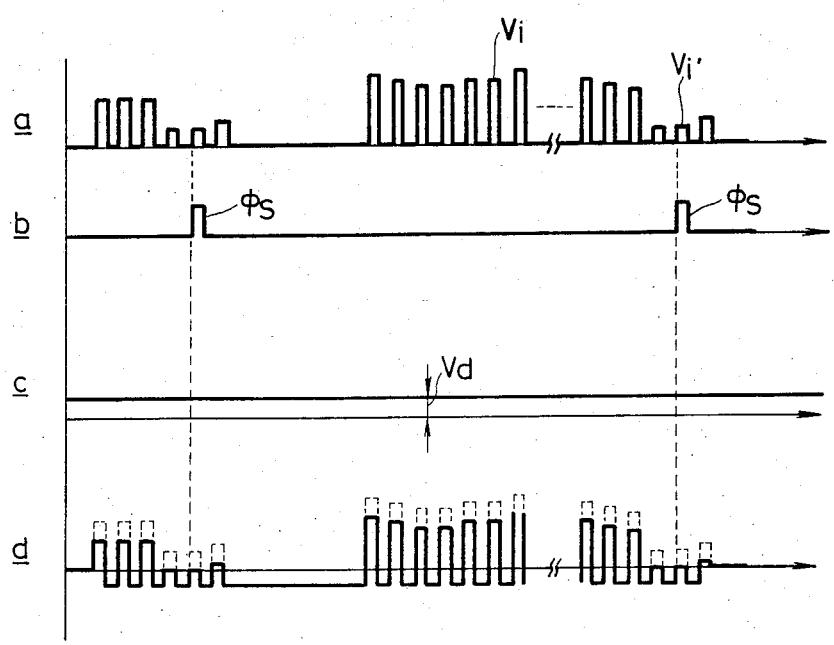

FIG. 9 is a diagram used for a description of the relationships between the photoelectric output provided by the subtraction circuit and the photoelectric output prior to being subjected to subtraction. Waveform a of FIG. 9 shows the photoelectric output $V_i$ inputted to the subtraction circuit 28, and waveform b of FIG. 9 indicates the sampling signal $\phi_S$.

Waveform c of FIG. 9 shows the sample-and-hold voltage $V_d$ corresponding to the dark current component. The operational amplifier 32 provides the photoelectric output which is obtained by subtracting the voltage $V_d$ from the photoelectric output $V_i$. Waveform d of FIG. 9 shows the photoelectric output provided by the operational amplifier 32.

The quantity of charge accumulated in the light-receiving element array 4 depends on the intensity of light E. Therefore, as the intensity of light E decreases, the time required for the output voltage $V_m$ of the light-detecting element array 4 to reach the threshold value $V_f$ is increased, while the charge accumulation time T of the photoelectric element array 3 is also increased, as shown in FIG. 8. Accordingly, the interval of generation of the start pulse signal, that is, the frequency of the start pulse signal, changes linearly with the intensity of light. When the intensity of light changes from $E_1$ to $E_2$, the photoelectric characteristic is in the dynamic range $d_1$. When the charge accumulation time is changed from $T_1$ to $T_3$, it is equivalent to the fact that the intensity of light is changed from $E_3$ to $E_4$. Thus, in this case, the dynamic range is increased to $d_2$.

Figure 10:
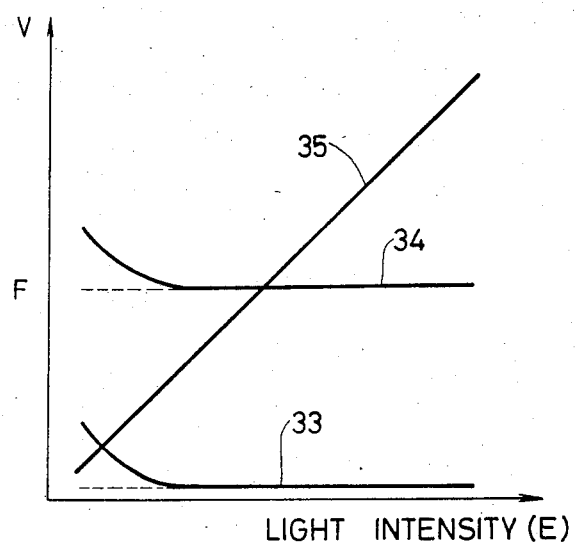
FIG. 10 is a graphical representation showing the relationships between the intensity of light and the photoelectric output in the dark current compensating circuit of the invention.

FIG. 10 shows the waveforms of the start pulse signal Sp and the photoelectric output $V_i$ with the intensity of light E. As the intensity of light decreases, the oscillation frequency of the start pulse signal is decreased while the charge accumulation time is increased. Therefore, in this case, the photoelectric output is maintained unchanged. However, because of the effect of the dark current, the photoelectric output will increase. In FIG. 10, reference numeral 33 designates the dark output characteristic; 34, the photoelectric output characteristic; and 35, the start pulse oscillation frequency characteristic.

According to the invention, the dark current component is removed and the compensation is completely achieved. Therefore, even when the intensity of light is small, as in the case where the intensity of light is large, the photoelectric output is maintained constant (as indicated by the broken line in FIG. 10).

As is clear from the above description, in the dark current compensating circuit of the invention, at least one of the photoelectric elements is shielded from light, and the photoelectric output of the thus light-shielded photoelectric element is removed as the dark current component. Therefore, a photoelectric output which has no dark current can be obtained. Thus, linearity is maintained in the case of a low intensity of light, while the dynamic range is increased.

In the photoelectric output dark current compensating circuit of the invention, the photoelectric output corresponding to the dark current component, which is sampled and held and subjected to subtraction, is not one which is provided by a present scanning, but one which is sampled and held immediately before such present scanning.

We claim:

1. A detecting circuit comprising:
   an array of photoelectric elements, at least one of said photoelectric elements being shielded from light to obtain a photoelectric output corresponding to a dark current component;
   a scanning circuit for scanning said photoelectric elements in a predetermined order to sequentially transfer out charges accumulated in said photoelectric elements to provide photoelectric outputs, wherein said scanning circuit comprises a pulse oscillator for supplying a continuous stream of clock pulses, a drive circuit for applying activating pulses to said photoelectric elements in a predetermined sequence in response to said clock pulses produced by said pulse oscillator, and drive signal generating means for initiating operation of said drive circuit in response to an instantaneous intensity of light exceeding a predetermined level striking said drive signal generating means;
   a sample-and-hold circuit connected to an output of said scanning circuit, said sample-and-hold circuit receiving as an input said photoelectric output of said at least one photoelectric element shielded from light; and
   a subtraction circuit having one input coupled to an output of said subtraction circuit for receiving the sampled-and-held photoelectric output corresponding to said dark current component and a photoelectric output other than said photoelectric output from said array corresponding to said current component and subtracting said photoelectric output corresponding to said dark current component from said photoelectric output other than said photoelectric output corresponding to said dark current.

2. The detecting current of claim 1, wherein said drive signal generating means comprises: a comparator having a first input terminal coupled to a source of a reference voltage; a light-detecting element having an output terminal coupled to a second input terminal of said comparator; and an analog switch coupled between said second input terminal of said comparator and a power supply terminal for selectively deactivating said light-detecting element, an output terminal of said comparator being coupled to an enable input of said drive circuit.

3. The detecting circuit of claim 1, wherein said scanning circuit further comprises a light-detecting element extending parallel to said array of photoelectric elements for measuring said instantaneous intensity of light.

4. The detecting circuit of claim 1, wherein said at least one of said photoelectric elements shielded from light consists of a single photoelectric element disposed in a next-to-the-end position of said array.

* * * * *